July 1, 1930.  J. B. COLEMAN ET AL  1,768,888

FREQUENCY CONTROL DEVICE

Filed Sept. 13, 1926

WITNESSES:

INVENTORS
John B. Coleman
and Frank Conrad.
BY
ATTORNEY

Patented July 1, 1930

1,768,888

UNITED STATES PATENT OFFICE

JOHN B. COLEMAN AND FRANK CONRAD, OF PITTSBURGH, PENNSYLVANIA, ASSIGNORS TO WESTINGHOUSE ELECTRIC AND MANUFACTURING COMPANY, A CORPORATION OF PENNSYLVANIA

FREQUENCY-CONTROL DEVICE

Application filed September 13, 1926. Serial No. 134,973.

Our invention relates to frequency-control devices, and particularly to piezo-electric crystal holders.

One object of our invention is to provide a piezo-electric crystal holder that is unaffected by changes in temperature or humidity.

Another object of our invention is to provide in a piezo-electric crystal holder having a plurality of space-separated electrodes, insulating supporting means for the electrodes so arranged that changes in the physical dimensions thereof will not cause undesirable changes in the space relationship of the electrodes.

Another object of our invention is to provide in a device of the type described, a dust-proof housing for the crystal.

A further object of our invention is to provide in a device of the above indicated character, a relatively fixed electrode, a rotatable electrode adapted to support a piezo-electric crystal, and means whereby the rotation of the electrode is prevented from causing a rotation of the crystal.

The rapidly increasing number of radio transmitting stations has developed a very pressing need for devices by which the radiated frequency of any station may be maintained constant. Difficulty has been experienced with frequency-control devices utilizing piezo-electric crystals, by reason of the fact that the slightest change in the spacing of the electrodes between which the crystal is held causes an appreciable variation of the natural vibration frequency of the crystal, and a consequent variation in the frequency radiated.

We have discovered that the variation in electrode spacing is caused by changes in the dimensions of the insulating body on which the electrodes are mounted, none of the crystal holders of the prior art having been so designed as to be unaffected by changes in atmospheric conditions.

According to our invention, we mount each of the electrodes on an insulating body, preferably of a material having a low coefficient of expansion, in such manner that changes in the dimensions of the body do not cause changes in the capacity of the condenser constituted by the electrodes, nor cause the crystal supported by one of the electrodes to move toward or from the other electrode. We also provide means for making minute and accurate adjustments of the space between the electrodes, and are, consequently, able to provide a crystal holder that permits a crystal to vibrate therein at a substantially constant frequency.

Figure 2:
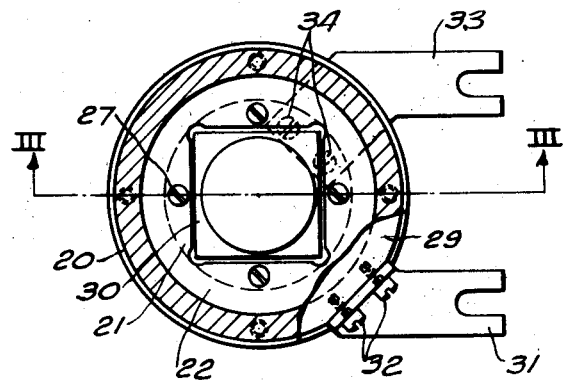
Figure 3:
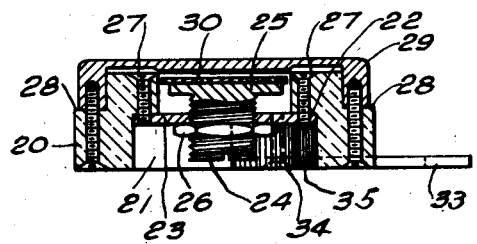

The novel features which we believe to be characteristic of our invention are set forth with particularity in the appended claims. Our invention itself, however, both as to its organization and method of operation, will best be understood by reference to the following description taken in connection with the accompanying drawings, in which Fig. 1 is a perspective view of a device embodying our invention, Fig. 2 is a plan view, partly in section, of a preferred form of our invention, and Fig. 3 is a cross-sectional view of the device shown in Fig. 2 taken along a line corresponding to the line III—III in Fig. 2.

Figure 1:
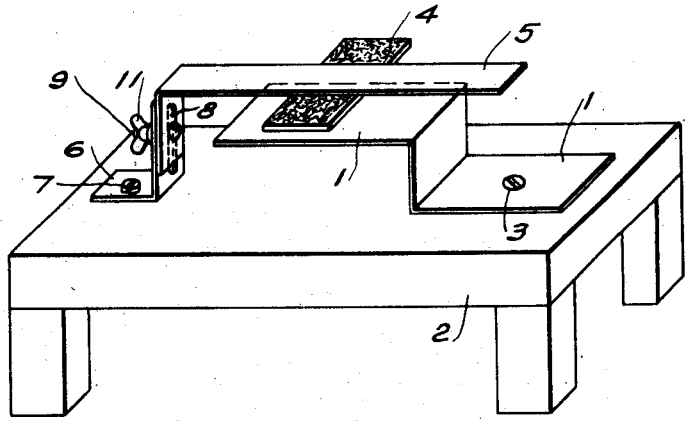

Referring particularly to Fig. 1, an electrode 1 is affixed to an insulating body 2 by means of a screw 3 or analogous means. A piezo-electric crystal 4 rests upon and is supported by the electrode 1, being held in definite space relation to a second electrode 5 adjustably mounted on a supporting device 6. The supporting device is affixed to the insulating body by means of a screw or bolt 7, and has an elongated opening 8 therethrough to accommodate a bolt 9 attached to the electrode 5. By loosening a wing-nut 11, the electrode 5 may be adjusted relative to the supporting device 6.

Assuming, for purposes of explanation, that the space between the movable electrode 5 and the fixed electrode 1 has been so adjusted that the crystal 4, after the electrodes have been properly connected in circuit, will oscillate at the desired frequency, it is apparent that changes in the dimensions of the insulating body 2 will have no effect on the capacity of the condenser constituted by the two electrodes. If the insulating body increases in length in a direction parallel to its longest dimension, the resulting parallel movement of the two electrodes does not alter the electrical capacity therebetween. If the thickness of the insulating body 2 is increased vertically, due to expansion with rising temperature, both electrodes will move equally, and the capacity will also remain unchanged.

The device illustrated in Fig. 1, although functioning according to our invention, is obviously not practicable from a commercial standpoint. We have accordingly shown, in Figs. 2 and 3, a preferred form of our invention as embodied in a crystal holder adapted for actual use in connection with radio transmitting stations.

In Figs. 2 and 3 a body of insulating material 20, such as glass, bakelite, hard rubber, or the like, is provided with a central opening 21. The opening is provided with an interior shoulder 22 on which a metallic plate 23 is mounted. An adjusting screw 24, carrying an electrode 25, passes through an opening in the element 23, and is rotatable therein. The adjusting screw 24 may be provided with a locknut 26, if desired, and the plate 23 may be affixed to the shoulder either by a plurality of screws 27, or may be molded in place.

An exterior shoulder 28 is also provided on the insulating body, the surface of this shoulder preferably being located in the same plane as that of the surface of the interior shoulder 22. A cup-shaped element 29 is held affixed to the exterior shoulder by a plurality of screws, permitting it to be removed when it is desired to either insert or remove a crystal 30. In addition to serving as an electrode, the element 29 also prevents dust and dirt from coming in contact with the crystal.

A mounting lug 31 is provided, which is rigidly connected to the cup-shaped electrode 29 by means of a plurality of screws 32. A second mounting lug 33 is connected to the movable-electrode carrying plate 23 by means of a plurality of screws 34, a spacing element 35 being inserted between the inner end of the lug and the plate in order to provide rigidity. The lower edge of the insulating body is channeled to provide a passage for the mounting lug 33, permitting the device to rest evenly on a flat surface, if desired.

The movable electrode 25 supports the crystal, and by rotating the adjusting stem 24 the spacing between the two electrodes, and consequently the capacity of the condenser constituted thereby, may be changed.

It is not desirable that the crystal rotate with the movable electrode, and consequently upper portion of the opening 21 is made square or rectangular in cross-section, and is given such dimensions that the crystal will be restrained from rotating when the movable electrode is turned.

From a consideration of Fig. 3 it is apparent that the upper surface of the electrode-supporting plate 23 and the under surface of the cup-shaped electrode 29 are located in substantially the same plane, corresponding to the location of the electrode 1 and the support 6 in Fig. 1. Changes in the dimensions of the insulating body caused by changing temperature will accordingly have a minimum effect on the spacing of the electrodes, for the same reasons as previously given.

To further minimize the effect of temperature changes on the electrode spacing, we may utilize invar, or some other well known material having a low coefficient of expansion, for the metallic parts of our device, and we may also employ boro-silicate glass, isolantite, quartz, or any other insulating material having a similarly low coefficient of expansion.

A frequency control device constructed according to our invention is substantially unaffected by changing weather conditions. Temperature variations do not appreciably alter the electrode spacing, and moisture, dust and dirt are effectively prevented from coming into contact with the electrodes and the crystal supported therebetween.

A long leakage path is also provided between the electrodes, which is a decided advantage if the device is to be used where the humidity in the atmosphere is excessive. The lower part of the opening 21 may be filled with a sealing compound after the electrode spacing has been accurately determined for a given frequency, thus giving an added protection against the intrusion of dirt and moisture.

Although we have illustrated and described herein certain specific embodiments of our invention, we are fully aware that many other modifications are possible. We do not intend, therefore, that our invention shall be limited except in so far as is necessitated by the prior art, and as indicated by the appended claims.

We claim as our invention:

1. In a frequency-control device, an insulating body, an electrode carried by said body, electrode supporting means also carried by said body, and an electrode mounted on said supporting means and associated with said first electrode to constitute therewith an adjustable condenser capable of utilizing a piezo-electric crystal as a part of the dielectric thereof, the insulating body, the first electrode, and the electrode supporting means being so disposed with reference to each other that any tendency for the insulating body to change in dimensions with changing weather conditions is prevented from causing any tendency for the capacity to change.

2. In a frequency-control device, an insulating body having an opening therethrough, a cup-shaped electrode so mounted on said body as to cover one side of said opening, an electrode support mounted interiorly of said opening, and an adjustable electrode carried by said support.

3. In a frequency control device, an insulating body having an opening therethrough adapted to receive a piezo-electric crystal and restrain it from movement around an axis substantially parallel to the axis of said opening, an electrode mounted on said body and forming a cover for said opening, and a movable electrode mounted within said opening and associated with the first electrode to constitute a variable condenser.

4. In a frequency control device, an insulating body having an opening therethrough, an electrode so mounted on said body as to cover said opening, a movable electrode supported within said opening and associated with the first electrode to constitute a variable condenser, means accessible from the exterior of the device for adjustment of the movable electrode, and mounting lugs electrically connected to each electrode.

5. A piezo-electric-crystal holder comprising a plurality of electrodes and insulating means for so supporting said electrodes as to provide a crystal-receiving space therebetween, the areas of contact between the several electrodes and the insulating means being concentric annuli lying in substantially a single plane intersecting said insulating means.

6. In a frequency-control device, an insulating body having a stepped opening therethrough and being provided with an exterior shoulder, said stepped portion and said shoulder lying in substantially a single plane, a cup-shape electrode mounted on said shoulder, and an electrode supported from said stepped portion interiorly of said cup-shape electrode, whereby changes in the dimensions of said insulating with changing weather conditions is substantially prevented from causing a change in the relative spacing of said electrodes.

In testimony whereof, we have hereunto subscribed our names this 7th day of September, 1926.

JOHN B. COLEMAN.
FRANK CONRAD.